(12) United States Patent
Selyugin et al.

(10) Patent No.: US 11,136,108 B2
(45) Date of Patent: Oct. 5, 2021

(54) COMPOSITE STRUCTURAL ELEMENT

(71) Applicant: Airbus Operations GmbH, Hamburg (DE)

(72) Inventors: Sergey Selyugin, Hamburg (DE); Jan-Ronald Balzer, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 434 days.

(21) Appl. No.: 16/277,297

(22) Filed: Feb. 15, 2019

(65) Prior Publication Data
US 2019/0263499 A1 Aug. 29, 2019

(30) Foreign Application Priority Data
Feb. 23, 2018 (DE) .......................... 102018104122.5

(51) Int. Cl.
*B64C 3/18* (2006.01)
*B29C 70/20* (2006.01)
(Continued)

(52) U.S. Cl.
CPC ............ *B64C 3/185* (2013.01); *B29C 70/202* (2013.01); *B32B 5/02* (2013.01); *B32B 5/26* (2013.01);
(Continued)

(58) Field of Classification Search
CPC ..... B29C 70/202; B29C 70/30; B29C 70/543; B29C 66/721; B29C 66/72141;
(Continued)

(56) References Cited

U.S. PATENT DOCUMENTS 7,668,701 B2 2/2010 Meizoso Latova et al.
7,840,389 B2 11/2010 Gallet et al.
(Continued)

FOREIGN PATENT DOCUMENTS

EP 2671707 A1 12/2013
EP 2910365 B1 4/2017

OTHER PUBLICATIONS

European Search Report for Corresponding European Patent Application No. 19155037 dated Jul. 5, 2019.
(Continued)

*Primary Examiner* — Camie S Thompson
(74) *Attorney, Agent, or Firm* — Greer, Burns & Crain, Ltd.

(57) ABSTRACT

A composite structural element comprising a substantially planar main section defining a coordinate system with a first axis extending along a longitudinal axis of the structural element and a second axis extending perpendicular to the longitudinal axis within the planar main section. The structural element contains a basic lay-up of single plies, each comprising a fiber-reinforced composite material with a substantially unidirectional fiber orientation. The lay-up comprises N plies arranged from top to bottom in the following form: [[α, β]M; [γ]K; [β, α]M], wherein α, β and γ represent one ply having an angle enclosed between the first axis and the unidirectional fiber orientation of the one ply, respectively, [x]y means y plies each having angle x; [x, y]z means z pairs of plies, K and M are both positive integers equal to or greater than 1: N=4·M+K.

8 Claims, 11 Drawing Sheets

(51) Int. Cl.
  *B32B 33/00* (2006.01)
  *B32B 5/26* (2006.01)
  *B32B 5/02* (2006.01)
  *B64F 5/10* (2017.01)
  *B29K 105/10* (2006.01)
  *B29L 31/30* (2006.01)
  *B32B 5/12* (2006.01)

(52) U.S. Cl.
  CPC .............. *B32B 33/00* (2013.01); *B64C 3/187* (2013.01); *B29K 2105/108* (2013.01); *B29L 2031/3085* (2013.01); *B32B 5/12* (2013.01); *B32B 2250/05* (2013.01); *B32B 2250/20* (2013.01); *B32B 2307/546* (2013.01); *B32B 2605/18* (2013.01); *B64F 5/10* (2017.01)

(58) Field of Classification Search
  CPC ................ B29C 66/207; B29C 66/228; B29K 2105/105; B29K 2105/108; B29K 2105/0881; B29K 2307/04; B29L 2031/3076; B29L 2031/3085; Y10T 428/24116; Y10T 428/24124; Y10T 156/10; B64C 3/20; B64C 3/182; B64C 2001/0072; B64C 1/061; B64C 1/12; B64C 3/185; B64C 3/187; B32B 2260/021; B32B 2260/046; B32B 2260/106; B32B 2605/18; B32B 5/12; B32B 5/26; B32B 2307/542; B32B 2307/544; B32B 2305/08; B32B 5/28; B32B 5/06; B32B 2260/023; B32B 2250/20; B32B 1/00

USPC ...... 428/113; 264/258; 244/117 R, 120, 133; 156/60

See application file for complete search history.

(56) References Cited

U.S. PATENT DOCUMENTS

| | | |
  |---|---|---|
  | 8,306,789 B2 | 11/2012 | Krog |
  | 8,556,213 B2 | 10/2013 | Markowski et al. |
  | 9,827,737 B2 * | 11/2017 | Selyugin ................ B64C 3/185 |
  | 2011/0045232 A1 | 2/2011 | Kismarton |
  | 2012/0177872 A1 | 7/2012 | Tsai et al. |
  | 2013/0330503 A1 | 12/2013 | Kismarton |

OTHER PUBLICATIONS

German Search Report; priority document.
  Sergey Selyugin, "On Lay-Up Optimization of Anisotropic Composite Plates in Post-Buckling", ECCM17—17th European Conference on Composite Materials, Munich, Germany, Jun. 26-30, 2016, pp. 1-7.

* cited by examiner

| | Positive loading 2.625 (=1.5*1.75) | Negative loading 2.625 |
|---|---|---|
| [-/+45°]4S | 14.6 mm / 1.3e-02 | 13.5 mm / 8.0e-03 |
| [-20°/40°]4S nearly equal buckling level for both loading direct. | 12.1 mm / 8.6e-03 | 9.4 mm / 8.4e-03 |
| [[-20°/40°]3, -75°,-75°]S | 6.8 mm / 5.2e-03 | 5.6 mm / 4.4e-03 |

Max deflection, mm

Max compression strain

| | Positive/negative loading 7.16 (=1.3*5.5) |
|---|---|
| $[-/+45°]_{6S}$ | 10.6 mm / 9.2e-03 |
| $[-20°/40°]_{6S}$ nearly equal buckling level for both loading directions | 5.3 mm / 8.9e-03 |
| $[[-20°/40°]_4, -20°, -75°]_{3}]_S$ | 3.3 mm / 5.1e-03 |

Max deflection, mm
Max compression strain

| | Positive/negative loading 2.745 (=1.5*1.83) |
|---|---|
| $[-/+45°]_{4S}$ | 12.5 mm / 9.3e-03 |
| $[-20°/40°]_{4S}$ nearly equal buckling level for both loading directions | 8.4 mm / 7.9e-03 |
| $[[-20°/40°]_3, [-75°]_2]_S$ | 4.9 mm / 4.8e-03 |

Max deflection, mm
Max compression strain

COMPOSITE STRUCTURAL ELEMENT

CROSS-REFERENCES TO RELATED APPLICATIONS

This application claims the benefit of the German patent application No. 10 2018 104 122.5 filed on Feb. 23, 2018, the entire disclosures of which are incorporated herein by way of reference.

FIELD OF THE INVENTION

The present disclosure generally relates to a composite structural element (e.g., for use as a rib or a spar), with high resistance to shear buckling and post-buckling.

For instance, present disclosure relates also to shear-loaded composite laminated plates. Those are, e.g., suitable for aircraft components, such as spars and ribs, without being restricted thereto. Shear-loaded panels are also widely used, e.g., in civil engineering, automotive or marine design.

BACKGROUND OF THE INVENTION

FIG. 1 shows an illustration of the composite element behavior under shear loading defined in the present disclosure. That is, the term "buckling" means loss of structural (mechanical) stability. This means that for a certain load level (the so-called Eigen-value level), out-of-plane deflections of the in-plane-loaded plate may occur. The directions of 0° and 90° ply orientation angles are also shown by arrows on the right-hand side of FIG. 1. In relation to the 0° direction, the angle of the fiber-reinforced composite material of the ply with a substantially unidirectional fiber orientation can be defined.

FIG. 1 shows the first buckling mode of the in-plane-shear-loaded (big arrows) long angle-ply (having said angle of −45° or +45°, which may be arranged in alternating pairs of plies) having 16-layers and pertaining to a 2 mm thick plate with symmetric lay-up. The shear flow is constant.

Further, the term "post-buckling" means structural deformations in case of loads above buckling level, both as deflections and in-plane displacements.

In the prior art, there is a conventional lay-up with laminates of 0°/45°/90°/135° angles. This means plies having angles of 0°, 45°, 90° and 135°, respectively, are laminated.

According to U.S. Pat. Nos. 7,840,389 B2 and 7,668,701 B2, there is prior art in the field of lay-up choice for composite plates/panels mentioning post-buckling. However, this prior art does not contain particular solutions with lay-up angle values.

According to U.S. Pat. No. 8,306,789 B2, there is also prior art in the field of lay-up choice methods for composite panels in general without any reference to post-buckling. That prior art merely describes design optimization methods/processes without any particular solution (targeted to post-buckling resistance) with lay-up angle values.

According to U.S. Pat. No. 8,556,213 B2, there is prior art in the field of lay-up choice methods for composite panels designed against buckling only without consideration of post-buckling.

Further, the lay-up solution of the present disclosure is based on the patent EP 2 910 365 B1 ("prior art document 1" hereinafter) assigned to the present applicant and on the theoretical results of the paper of "ON LAY-UP OPTIMIZATION OF ANISOTROPIC COMPOSITE PLATES IN POST-BUCKLING," S. Selyugin, Proceedings of the 17th European Conference of Composite Materials (ECCM17), Munich, 26 to 30 Jun. 2016 ("prior art document 2" hereinafter).

SUMMARY OF THE INVENTION

Accordingly, there is a need for an implementation of a scheme that avoids one or more of the problems discussed above, or other related problems.

The present disclosure aims at the following targets:

Provision of a symmetric lay-up of the composite structural element with high resistance to both shear buckling and post-buckling. That is, the present disclosure is devoted to providing an optimized lay-up solution for shear-loaded composite laminated plates that operate in a range "above buckling" in post-buckling.

As shown above, rectangular shear-loaded (in both directions) plates with symmetric lay-up are considered. Without loss of generality, it is assumed that the plate according to disclosure works above buckling without rupture (with loads up to 1.5 times of buckling level). It must be noted that the value is mere example applying, e.g., to aeronautics, but is in no way restrictive for the present disclosure.

Such plates may model, for example, bays between stiffeners of airplane Vertical Tail Plane (VTP) ribs and spars.

In addition, the present disclosure enables the following advantages:

The proposed lay-up solutions considerably improve the post-buckling load-carrying capability of the structural elements (e.g., composite structural element) in both shear loading planar directions, with the buckling load level for the loading directions being nearly equal and close to a maximum level.

The proposed solutions could lead to structural weight savings up to 10% as compared to the prior art design.

For the same level of shear loading (in both directions), the solution of the present disclosure leads to about 50% lower maximum post-buckling deflection and maximum post-buckling minimal principal strain (as compared to prior art angle-ply configuration).

The buckling level (approximately equal for both loading directions) differs within several %, being considerably higher than the prior art angle-ply lay-up. The layers in the proposed lay-ups located above several close-to-mid-plane [−75°] plies withstand mainly bending-twisting due to shear buckling as the initial point for post-buckling analysis. They are pairs of layers [−20°, +40°] (with a possible deviation of +/−5°). The layers near the mid-plane withstand the 2D-strains in the optimum way, the latter strains are important for the post-buckling.

The lay-up solution according to the present disclosure may be implemented for shear-loaded composite structural elements (in particular, VTP ribs and spars).

The lay-up solution according to the present disclosure improves the post-buckling load-carrying capability of the structural elements in both loading directions, with the buckling load level for the loading directions being nearly equal and close to the maximum level.

The lay-up solution according to the present disclosure combines both buckling and post-buckling high performance for both loading directions.

BRIEF DESCRIPTION OF THE DRAWINGS

The embodiments of the technique presented herein are described herein below with reference to the accompanying drawings, in which.

DETAILED DESCRIPTION OF THE PREFERRED EMBODIMENTS

Figure 1:
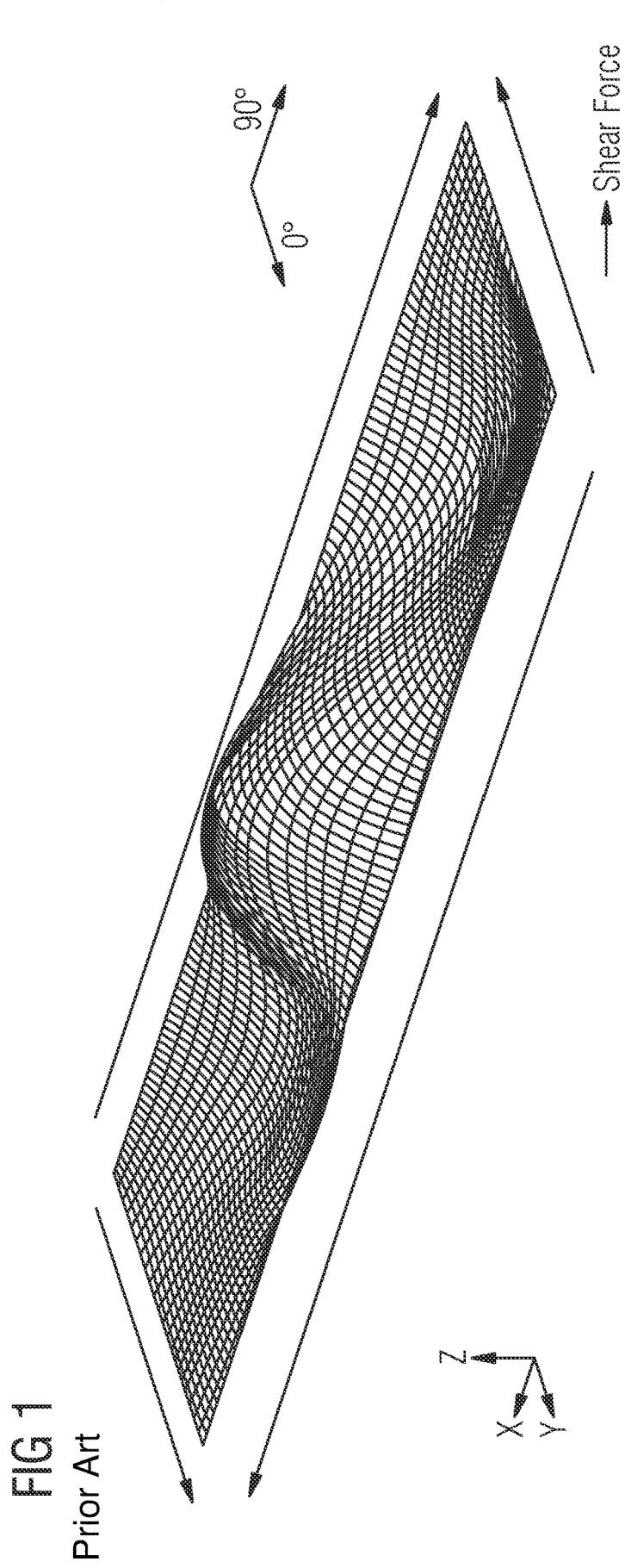
FIG. 1 shows an illustration of the composite element behavior under shear loading defined in the present disclosure.

Without loss of generality, the present disclosure can be summarized as follows: The purpose of the present disclosure is, e.g., to give an engineer a simple rule of choosing the symmetric non-conventional lay-up with high resistance to both buckling and post-buckling. The lay-up solutions considerably improve the post-buckling load-carrying capability of the structural elements in both loading directions, with the buckling load level for the loading directions being nearly equal and close to the maximum level. The proposed solutions, based on the current analysis, could lead to structural weight savings up to 10%, as compared to the today's design.

According to a first aspect, there is provided a composite structural element comprising a substantially planar main section defining a coordinate system with a first axis extending along the longitudinal axis of the structural element and a second axis extending perpendicular to said longitudinal axis within the planar main section and defining an angle of +90° with the first axis, wherein the structural element contains a lay-up of single plies each comprising a fiber-reinforced composite material with a substantially unidirectional fiber orientation, wherein the lay-up comprises N plies arranged from top to bottom in the following form, N being an positive integer number equal to or greater than 5: [[$\alpha$, $\beta$]M; [$\gamma$]K; [$\beta$, $\alpha$]M], wherein $\alpha$, $\beta$ and $\gamma$ represent one ply having an angle enclosed between the first axis and the unidirectional fiber orientation of the one ply, respectively, [x]y means y plies each having angle x, [x, y]z means z pairs of plies, each pair of plies having angles x, y, respectively, $\alpha=-20°$, $\beta=40°$, $\gamma=-75°$ or $\alpha=20°$, $\beta=-40°$, $\gamma=75°$, wherein each angle has a tolerance of $-5°$ to $+5°$ and K is a positive integer number equal to or greater than 1 and M is a positive integer number equal to or greater than 1 as follows: $N=4 \cdot M+K$.

According to a first refinement of the first aspect, the composite structural element preferably has the following structure: [[$\alpha$, $\beta$]M; [$\alpha$]; [$\gamma$]K; [$\alpha$]; [$\beta$, $\alpha$]M], wherein $N=2+4 \cdot M+K$.

According to a second refinement of the first aspect, the composite structural element preferably further comprises at least one further ply having an angle $\delta$ enclosed between the first axis and the unidirectional fiber orientation of the at least one further ply, wherein $\delta$ is preferably 90° near the mid-plane, $-20°$ far from the mid-plane or any other value and the at least one further ply is interposed between one or more of the N plies and the lay-up comprises N+P plies, P being a positive natural number equal to or greater than 1 and designating the number of further plies. In this case, the lay-up preferably comprises N plies arranged from top to bottom in the following form: [[$\alpha$, $\beta$]M, [$\delta$]L, [$\gamma$]K, [$\delta$]P, [$\gamma$]K, [$\delta$]L, [$\beta$, $\alpha$]M], wherein $N=4 \cdot M+2*L+2*K+P$. In addition or alternatively, K is preferably equal to or lower than N/3, more preferably equal to or lower than N/4. This second refinement leads to a general lay-up which covers all possible numbers of layers in a lay-up where the basic lay-up has some constraints in spite of symmetry and if the number of layers with angle $\gamma=-75°$ gets too high. Also, for the sake of manufacturing stability, several (preferably, a few) plies with angles preferably 90° near the mid-plane, $-20°$ far from the mid-plane or with other orientations preferably are added to the laminate between some layers but keeping the symmetry of the overall layup. This more general lay-up preferably is defined as: [[$\alpha$, $\beta$]M, [$\delta$]L, [$\gamma$]K, [$\delta$]P, [$\gamma$]K, [$\delta$]L, [$\beta$, $\alpha$]M]. In this regard, the following preferably applies: $\alpha=-20°$, $\beta=40°$, $\gamma=-75°$, $\delta=-20°$ or 90° or any other angle, preferably 90° near the center (or mid-plane) and $-20°$ far from the center (or mid-plane), wherein each angle has a tolerance of $-5°$ to $+5°$ and K is a positive integer number equal to or greater than 1 and M is a positive integer number equal to or greater than 1, L has the value 0 or 1 and P has a value of 0, 1 or 2. The lay-up comprises $N=4*M+2*L+2*K+P$.

According to a second aspect, there is provided a torsion box for use in an aircraft structural component, comprising at least one rib being a composite structural element according to the first aspect and at least one spar being a composite structural element according to any of the preceding claims.

According to a third aspect, there is provided an aircraft comprising a torsion box according to the second aspect Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein. This applies especially to an aspect of (adaptively) controlling a manufacturing process and/or analysis process pertaining to the composite structural element of the present disclosure.

In the following description, for purposes of explanation and not limitation, specific details are set forth in order to provide a thorough understanding of the technique presented herein. It will be apparent to one skilled in the art that the present technique may be practiced in other embodiments that depart from these specific details.

Herein below, the so-called post-buckling ratio (PBR) (i.e., the level of loads above pre-determined high buckling loads) being up to 1.5 is considered. This is the level used for the analysis of load-carrying capability in post-buckling, e.g., in aerospace industry. Simple-support boundary conditions (as most conservative) are considered throughout the present disclosure.

Figure 2:
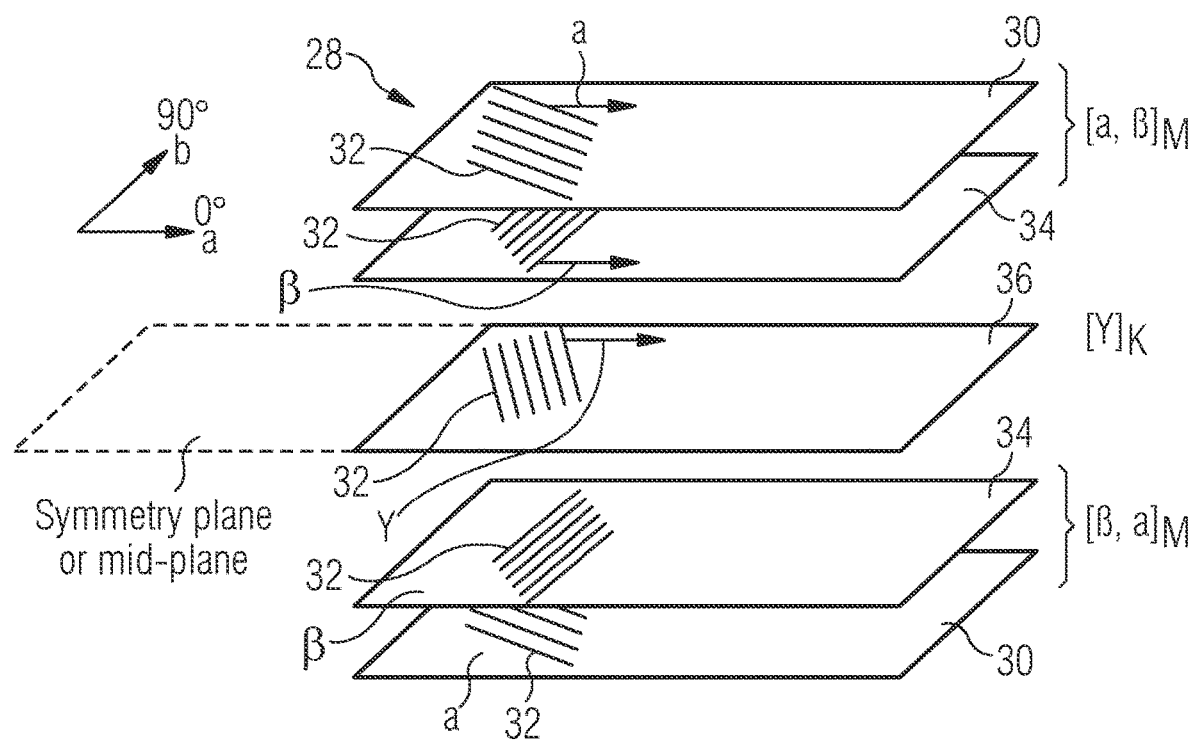
FIG. 2 shows a main apparatus embodiment of the composite structural element according to the present disclosure.

FIG. 2 shows a main apparatus embodiment of the composite structural element according to the present disclosure.

Figure 6:
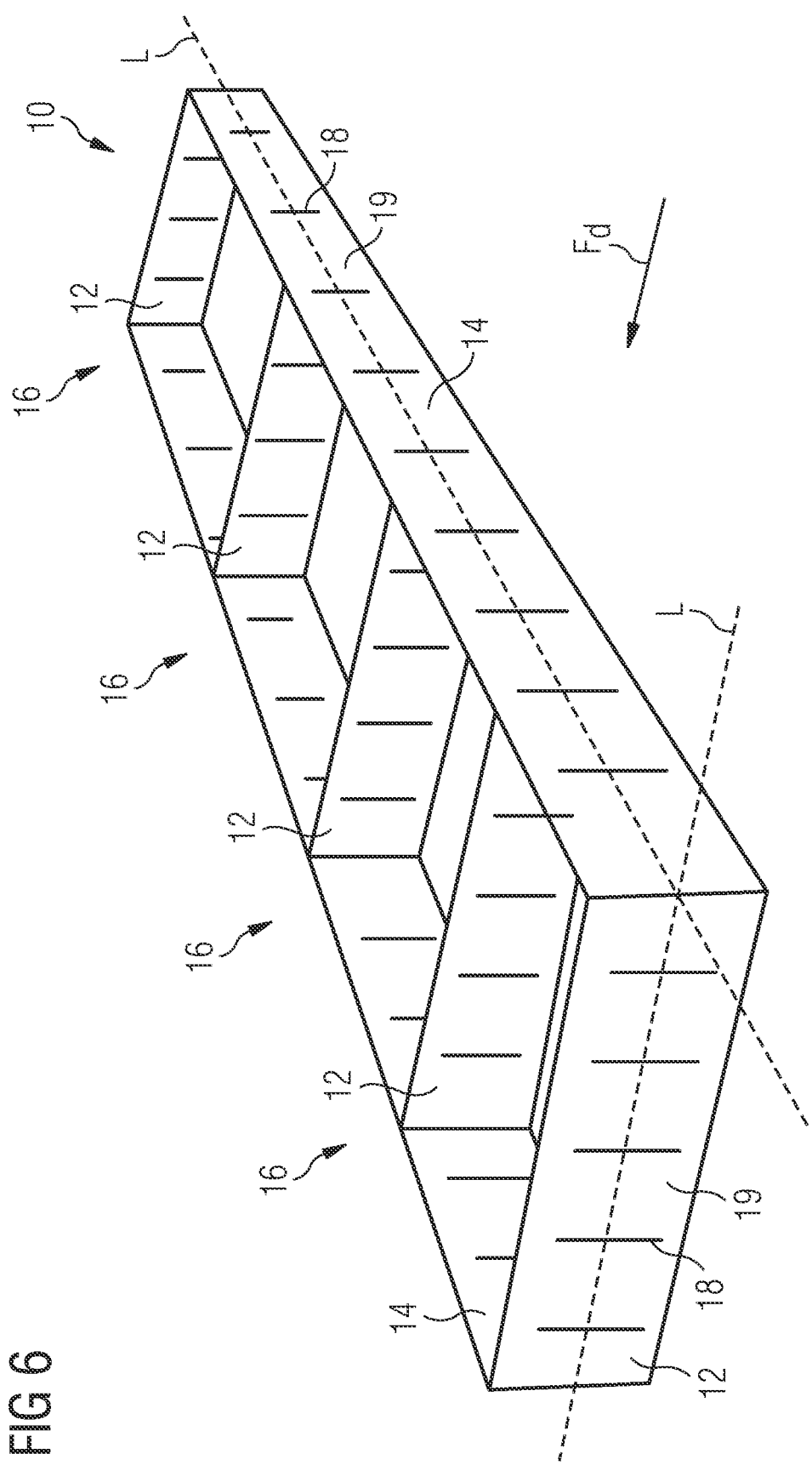
FIG. 6 shows a torsion box according to a third implementation example of the composite structural element according to the present disclosure.

As is shown in the embodiment of FIG. 6, a composite structural element 12, 14 is, e.g., for use as a rib 12 or a spar 14 (to be described later-on). The structural element 12, 14 comprises a substantially planar main section 22 (see also FIG. 4) defining a coordinate system with a first axis a extending along the longitudinal axis L of the structural element 12, 14 and a second axis b extending perpendicular to said longitudinal axis L within the planar main section and defining an angle of +90° with the first axis a.

Further, the structural element 12, 14 contains a lay-up 28 of single plies 30, 34, 36, 38 each comprising a fiber-reinforced composite material with a substantially unidirectional fiber orientation 32, wherein the lay-up 28 comprises N plies arranged from top to bottom in the following form (N being an positive integer number equal to or greater than 5): [[α, β]M; [γ]K; [β, α]M].

Here, α, β and γ represent one ply 30, 34, 36 having an angle enclosed between the first axis a and the unidirectional fiber orientation 32 of the one ply, respectively, as is shown in FIG. 2. Further, the notation "[x]y" means a number of y plies each having an angle x, and the notation "[x, y]z" means a number of z pairs of plies, each pair of plies having angles x, y, respectively. As is shown in FIG. 2, the order of x, y designates the order of lamination (defined from top to bottom): [α, β] stands for a ply having angle α followed by a ply having angle β, whereas [β, α] stands for a ply having angle β followed by a ply having angle α.

In turn, the angle α is equal to −20°, the angle β is equal to 40° and the angle γ is equal to −75°. Alternatively, the angle α is equal to 20°, the angle β is equal to −40° and the angle γ is equal to 75°. Each of the above angles has a tolerance of −5° to +5°.

Finally, the parameters of the above formula are set as follows. K is a positive integer number equal to or greater than 1 and M is a positive integer number equal to or greater than 1. Further, N is equal to 4·M+K.

Figure 7:
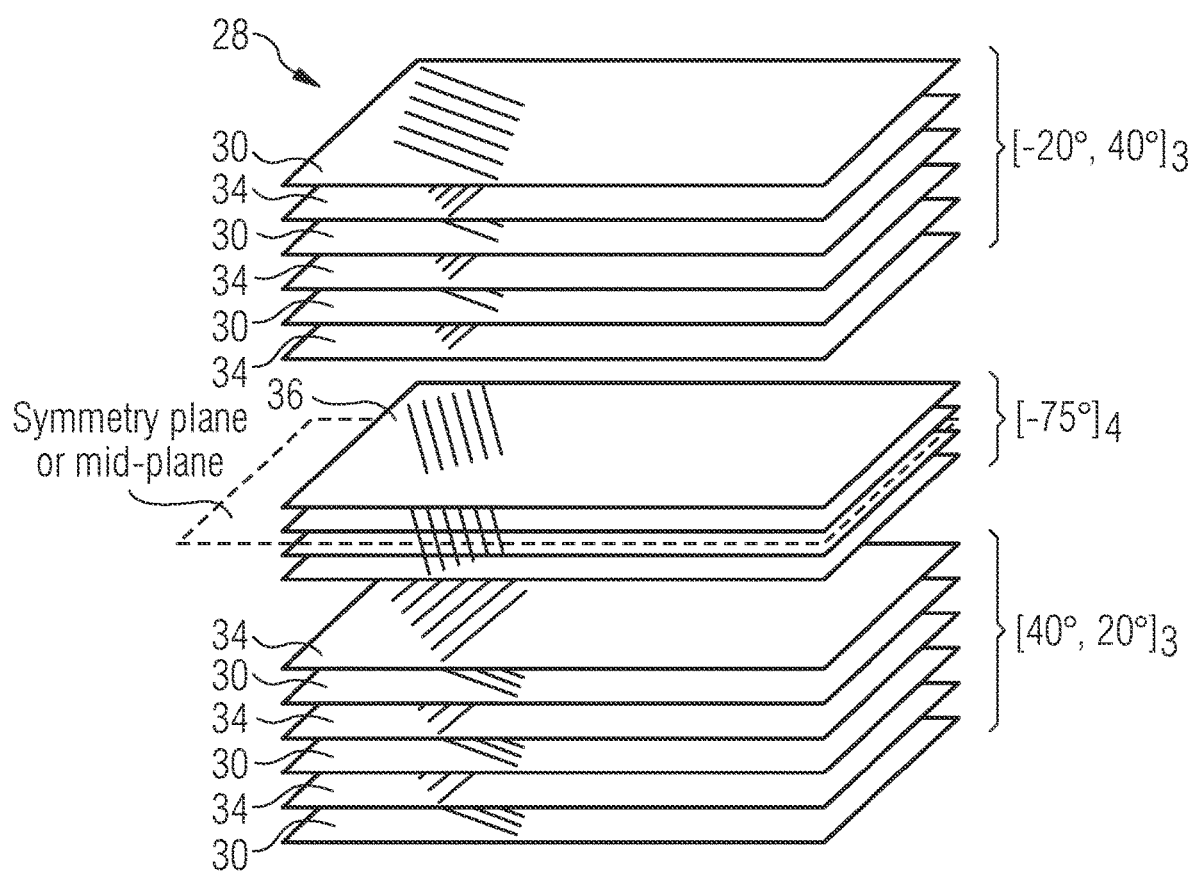
FIG. 7 shows a first embodiment of the ply arrangement of the composite structural element.

In other words, the final lay-up 28 preferably has an arrangement of the type [[[−20°, +40°]$_M$; [−75°]$_K$]$_S$], wherein the notation [x]$_S$ means that the ply arrangement x is mirrored in relation to the plane of symmetry or mid-plane, see for example FIG. 7.

Notably, also the following lay-up 28 solution is analogously valid as mirrored with respect to the X axis a or the Y axis b:

[[[20°,−40°]M; [75°]K]S] or

That is, in other words, based on the studies of the present inventors, the following lay-up 28 choice is proposed. The lay-up 28 that leads to the best post-buckling performance (both for deflection and compression strain) and high buckling loads is as follows. As constraints, without loss of generality, the overall laminate thickness preferably ranges from 5 plies up to a thickness of 5 mm in total, and plate aspect ratio preferably ranges between 1.5 and 4. The plate preferably models, for example, monolithic bays of airplane VTP ribs and spars. The PBR preferably is up to 1.5. The individual ply thickness preferably is equal to or lower than 0.25 mm.

The proposed lay-up 28 thus is: symmetric, a number of close-to-mid-plane plies are [−75°] plies (with practically small influence on buckling level), further plies, counting from the mid-plane, are pairs of [−20°, +40°] (the pairs represent the averaged lay-up giving equal buckling level for both loading directions). Allowed deviation of all the above angles is +/−5°. Further, up to 25% of close-to-mid-plane plies preferably are [−75°] plies. In other words, above-described parameter K is preferably equal to N/4 but lower than N/3. The higher the PBR is, the larger K has to be.

In addition, in the composite structural element 12, 14, a more general lay-up 28 preferably has the following structure: [[α, β]M; [α]; [γ]K; [α]; [β, α]M], wherein N=2+4·M+K.

In still other words, the lay-up 28 preferably also has an arrangement of an odd number of plies like [[−20°,+40°]M; −20°; [−75°]K; −20°; [+40°,−20°]M] or [[−20°,+40°]M; [−75°]K; [+40°,−20°]M], wherein K is an odd number in the latter case. Notably, also the more general lay-up 28 solution is analogously valid as mirrored with respect to the X axis a or the Y axis b: [[20°,−40°]M; 20°; [75°]K; 20°; [−40°, 20°]M] or

[[20°,−40°]M; [75°]K; [−40°,+20°]M], wherein K is an odd number in the latter case.

Figure 3:
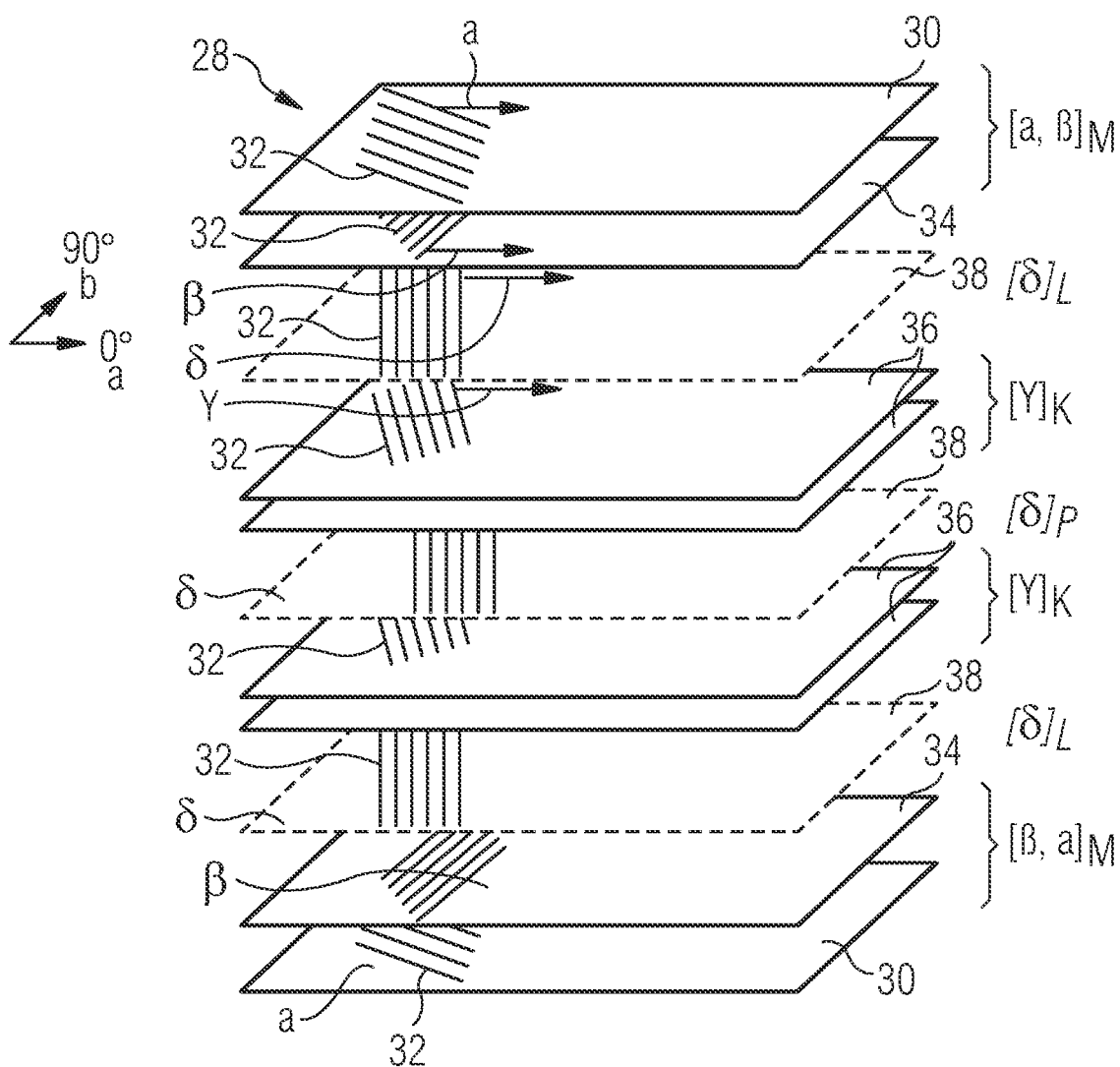
FIG. 3 shows a modification of the composite structural element of the present disclosure.

FIG. 3 shows a modification of the composite structural element of the present disclosure.

This modification leads to a general lay-up which covers all possible numbers of layers in a lay-up where the basic lay-up has some constraints in spite of symmetry and if the number of layers with angle γ=−75° gets too high. Also, for the sake of manufacturing stability, several (a few) plies with angles preferably 90° near the mid-plane, −20° far from the mid-plane or with other orientations preferably are added to the laminate between some layers but keeping the symmetry of the overall layup.

The general lay-up preferably is preferably defined as: [[α, β]M, [δ]L, [γ]K, [δ]P, [γ]K, [δ]L, [β, α]M], where α=−20, β=40, γ=−75, δ=−20°, 90° or another value, preferably 90° near the center and −20° far from the center. Preferably, each angle has a tolerance of −5° to +5° and K is a positive integer number equal to or greater than 1 and M is a positive integer number equal to or greater than 1, L has the value 0 or 1 and P has a value of 0, 1 or 2. The lay-up preferably comprises N=4*M+2*L+2*K+P. In addition, K is preferably equal to N/4 and lower than N/3.

That is, the composite structural element preferably further comprises at least one further ply 38 having an angle δ enclosed between the first axis (a) and the unidirectional fiber orientation 32 of the at least one further ply. δ preferably is 90° near the center and −20° far from the center or any other value. Without loss of generality, as shown in FIG. 3, ply 38 preferably is interposed between the outermost ply 36 having the angle γ and the ply 34 having the angle β (or the top single ply 30 having the angle α), while another ply 38 preferably is interposed in the center between several plies 36 having the angle γ but always respecting the symmetry of the entire lay-up.

That is, the at least one further ply 38 is preferably interposed between one or more of the N plies. Further, the lay-up preferably comprises N+P plies, P being a positive natural number equal to or greater than 1 and designating the number of further plies 38.

Figure 4:
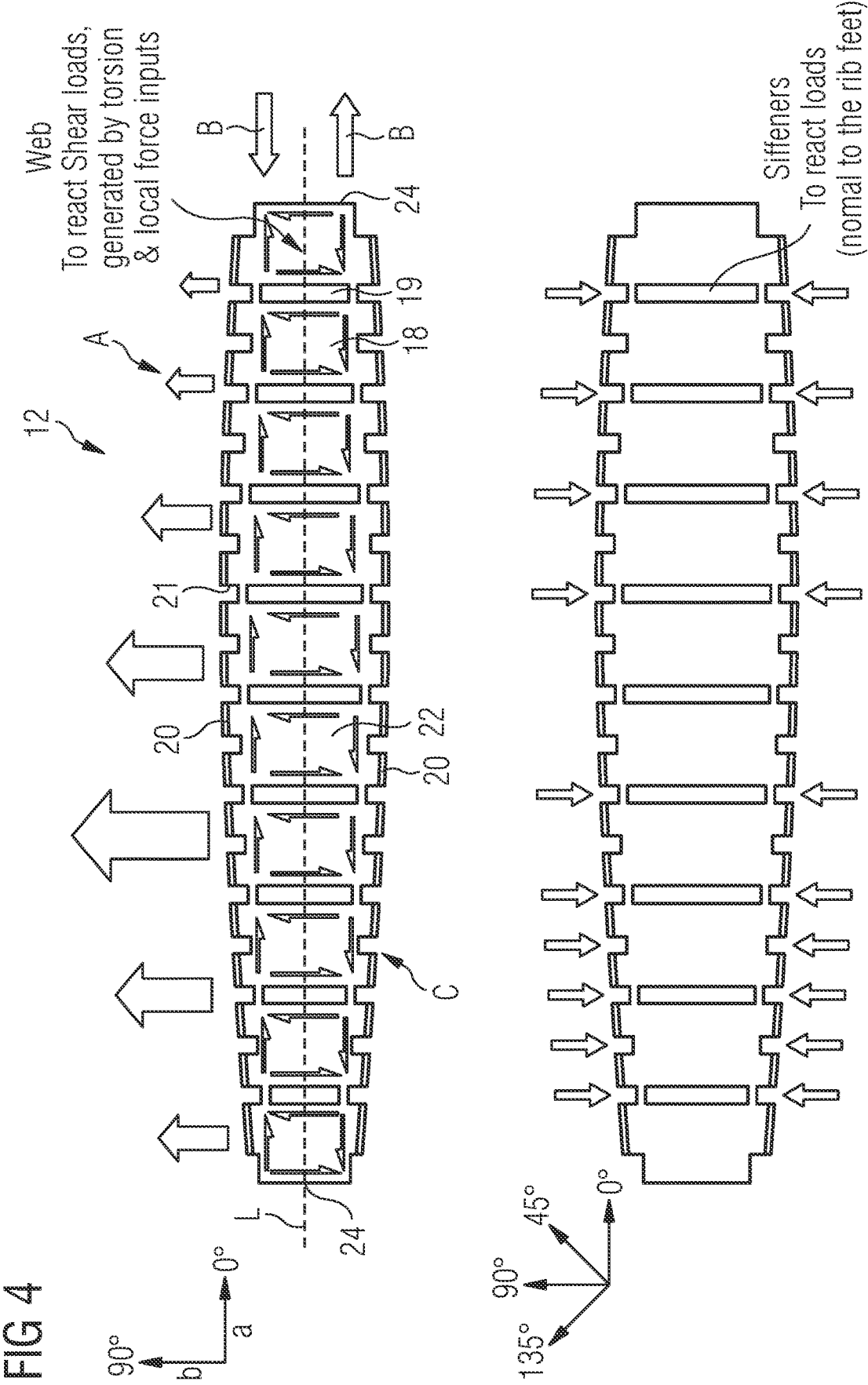
FIG. 4 shows a rib according to a first implementation example of the composite structural element according to the present disclosure.
Figure 5:
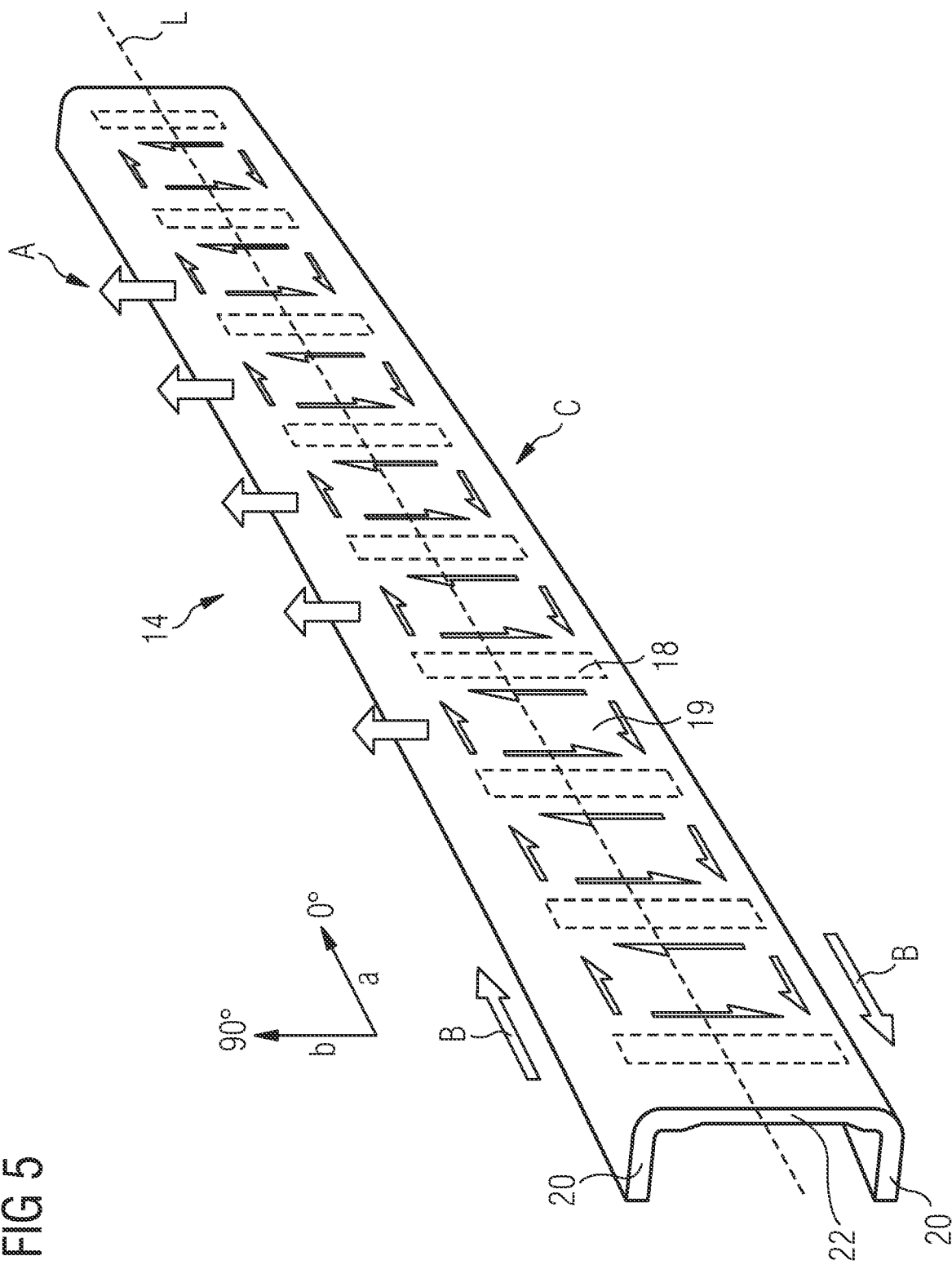
FIG. 5 shows a spar according to a second implementation example of the composite structural element according to the present disclosure.

FIG. 4 shows a rib 12 according to a first implementation example of the composite structural element according to the present disclosure, while FIG. 5 shows a spar 14 according to a second implementation example of the composite structural element according to the present disclosure. Furthermore, FIG. 6 shows a torsion box 10 according to a third implementation example of the composite structural element according to the present disclosure.

That is, the torsion box 10 (e.g., for use in an aircraft structural component, such as a VTP) comprises at least one rib 12 being the composite structural element described above and at least one spar 14 being the composite structural element described above.

In this regard, FIG. 6 is a perspective view of the torsion box 10, e.g., for a vertical tail-plane (VTP) of an aircraft. The torsion box 10 comprises two types of composite structural elements (as described above) which are designed with a generally longitudinal shape and take the form of the ribs 12 and the spars 14 each having a corresponding longitudinal axis L as illustrated in FIG. 6.

In the following, the torsion box 10, the rib 12 and the spar 14 will be described in the context of an airplane implementation. Accordingly, the present disclosure covers also an airplane comprising the torsion box 10 described in the present disclosure. This does, however, not rule out the possibility of other implementation fields. For instance, the present disclosure preferably is applied to a marine structure comprising at least one composite structural element as described herein. Further, the present disclosure preferably is applied to a beam or a shear web for use in civil engineering or in automotive industry comprising at least one composite structural element as described herein.

With regard to a forward flight direction Fd, e.g., of the aircraft, the torsion box 10, when installed in the aircraft, is arranged with the spars 14 extending substantially transverse to the forward flight direction Fd and the ribs 12 extending substantially in parallel to said forward flight direction Fd. In FIG. 6, the left-hand spar 14 therefore defines a trailing edge and the right-hand spar 14 therefore defines a leading ledge of the torsion box 10. The ribs 12 preferably are arranged to extend between the spars 14 and preferably are connected thereto, e.g., by conventional means. Accordingly, the ribs 12 and spars 14 preferably are arranged in a substantially crosswise or net-shaped/mesh-like manner to define the torsion box 10. Thus, two adjacent ribs 12 and two opposite sections of the spars 14 preferably define a substantially rectangular hollow space 16 within the torsion box 10.

The torsion box 10 preferably is completed with non-illustrated thin-walled sheets or skins covering, in FIG. 6, the top and bottom surfaces of the torsion box 10. These skins preferably further are stiffened by stringers running substantially in parallel to the spars 14.

As further shown in FIG. 6, the ribs 12 and spars 14 preferably are provided with a plurality of stiffeners 18 extending substantially transverse to the respective longitudinal axes L and being distributed along these longitudinal axes L. The area between two adjacent stiffeners 18 is referred to as a "bay 19" in the following. For illustrative purposes, only one stiffener 18 and one bay 19 is provided with reference signs for only one of the ribs 12 and the spars 14.

FIG. 5 depicts a spar 14 of the torsion box of FIG. 1 in greater detail with the orientation corresponding to that of the right-hand spar 14 in FIG. 6. In FIG. 5, without loss of generality, the spar 14 is shown in a partial perspective view and configured with a C-shaped profile. Accordingly, the spar 14 comprises an upper and a lower flange section 20 as well as a planar main section 22 configuring a web section of the spar 14 which extends between the flange sections and substantially transverse thereto. Within the planar main section 22, the stiffeners 18 preferably are arranged confining numerous bays 19.

Furthermore, the major loads exerted on the spar 14 during an operation of the aircraft as well as the stresses resulting therefrom are indicated by arrows A, B in FIG. 5. A top row of arrows A pointing upwards indicates the direction of a main air load acting on the spar 14. Furthermore, two arrows B extending in parallel to the longitudinal axis L indicate further forces exerted on the spar 14. The main shear forces resulting from the forces according to arrows A and B are indicated by arrows C with asymmetric tips which extend within the planar main section 22 and bays 19 along different directions. Of course, there may exist further loads acting on the spar 14, for example, compressive forces in a direction opposite to the arrows A which are mainly compensated for by the stiffeners 18.

Moreover, a coordinate system is shown in FIG. 5 comprising the first axis a extending along the longitudinal axis L and defining an angle of 0° and a second axis b extending perpendicular to the longitudinal axis L within the planar main section 22. Hence, the second axis b defines an angle of +90° with the first axis a. As shown in FIG. 5, the second axis b extends in parallel to the arrows A and in the direction of the respective main air load. The coordinate system of FIG. 5 is coincident with the coordinate system described above in the context of the composite structural element.

With respect to this coordinate system, direct shear loading leading to positive shear forces and shear flows is defined as leading to a positive shear angle in said coordinate system, i.e., a shear angle as induced by the forces according to arrows B in FIG. 5. The scenario of opposite shear loading leading to negative shear flows occurs in the opposite case, i.e., with the arrows B respectively pointing in opposite directions.

With regard to the prevailing stresses within the planar main section 22, it is therefore obvious that a high buckling resistance is preferable against both of direct and opposite shear loading.

FIG. 4 is a detailed view of a rib 12 of the torsion box 10 of FIG. 6 as well as the major loads and stresses in connection therewith. To avoid repetitions, same features are associated with same reference signs in the following when compared to the previous description.

FIG. 4 represents a side view of the ribs 12 as is shown by the extension of the longitudinal axis L. The rib 12 is preferably configured with a slightly oval shape as well as an I-shaped cross-section (not illustrated in FIG. 4). Accordingly, at the upper and lower edges in FIG. 4, the rib 12 is preferably provided with flange sections 20 and a main planar section 22 configuring a web section extending there-between. At the outer ends of rib 12 along the longitudinal axis L, connecting sections 24 are provided which are complementary shaped to the C-profile of the spars 14 in order to be connected thereto. Furthermore, along the flange sections 20, several receiving sections 21 preferably are provided to receive stringers as attached to a top and bottom sheet, respectively, which forms a skin of the torsion box 10.

Similar to the spar 14 as discussed in connection with FIG. 5, a main air load indicated by arrows A is exerted in a substantially transverse direction to the longitudinal axis L on the rib 12. In addition, forces as indicated by arrows B are exerted in the direction of the longitudinal axis L, thus leading to main shear forces according to arrows C within the web section 22 of rib 12 along two different directions. Again, a coordinate system is defined by a first axis a extending along the longitudinal axis L of rib 12 and defining an angle of 0°, whereas a second axis b extends perpendicular to said longitudinal axis within the planar main section 22 and defines an angle of 90° with the first axis a. In the shown case, the second axis b extends in parallel to the arrows A and thus in the direction of the respective main air load.

To compensate for the main shear loads as discussed with respect to the previous figures, the ribs 12 and spars 14 are configured as unitary members (composite structural elements) and are made from of a lay-up 28 of single plies of fiber composite material as described above and as will be further described herein below.

FIG. 7 shows a first embodiment of the ply arrangement of the composite structural element 12, 14 following the basic lay-up.

As is shown in FIG. 7, first row of the table, the general prior art is evaluated in relation to a positive loading and a negative loading (described above). The general prior art teaches a symmetric lay-up comprising, for this experiment, plies in the form [−45°, 45°]4S, meaning that—from top to bottom—4 pairs of [−45°, 45°] plies are arranged, followed by 4 pairs of [45°, −45°] pairs.

Further, as is shown in the second row of the table, an arrangement as in patent document 1 is evaluated. The arrangement has a ply arrangement of the type [−20°, 40°]4S (meaning that—from top to bottom—4 pairs of [−20°, 40°] plies are arranged, followed by 4 pairs of [20°, −40°] pairs) yielding a nearly equal high buckling level for both loading directions (prior art document 1). That arrangement is used as an initial analysis reference in the embodiments of the present disclosure.

That is, a direct search of the solution according to the present disclosure with high resistance to post-buckling is made varying ply orientations near mid-plane. The results presented further correspond to 1-2% precision for objectives (minimal of maximum deflection and maximum compression strain is lower than 5·10−3).

With respect to the present application shown in the third row, the analysis performed shows that the orientation angle values for several near-mid-plane layers should be equal to each other and equal to [−75°], as described above.

To sum up, the composite structural element 12, 14 based on 16 plies preferably has the following structure: [[−20°, 40°]3; [−75°]4; [40°, −20°]3]. Further possible arrangements for other thicknesses and number of plies preferably are:

[[−20°, 40°]5, [−75°]4, [40°, −20°]5] or
[[−20°, 40°]2, [−75°]2, [40°, −20°]2].

As experimental constraints, the material chosen was a tape of 0.125 mm and of the type T300/5208, and a symmetric lay-up was used. Plate thickness was t=2 mm, plate dimensions were 200×600 mm, and 50 N/mm shear flow loading (both positive and negative directions) was applied.

As shown above, the evaluated configurations are:
First row: conventional prior art applying the arrangement of [−45°, +45°]4S, as described above.
Second row: prior art arrangement of patent document 1, being [−20°/40°]4S, as described above.
Third row: a preferred arrangement of the present disclosure, being in this case [[−20°, 40°]3, −75°, −75°]S, meaning a symmetric arrangement—from top to bottom—of 3 [−20°, 40°] ply pairs, followed by 4 [−75°] plies and followed in turn by 4 [40°, −20°] ply pairs.

The first entry in each cell shows the maximum deflection in mm, while the second entry shows the maximum compression strain (a dimensionless quantity).

The corresponding Eigen-values for the angle-ply solution (depending on the sign of loading) were 1.39/−1.79. As further shown in the table, the load level corresponds to PBR=1.5 times the level 1.75, i.e., 2.625.

The lay-up 28 solution (third row) outperforms the [−45°, +45°]4S approach of the conventional prior art in terms of maximum deflection and maximum compression strain, and provides a considerable improvement in relation to the approach of patent document 1 (second row). It is thus documented that the insertion of a number of [−75°] plies provides a surprising beneficial effect with respect to post-buckling resilience.

Figure 8:
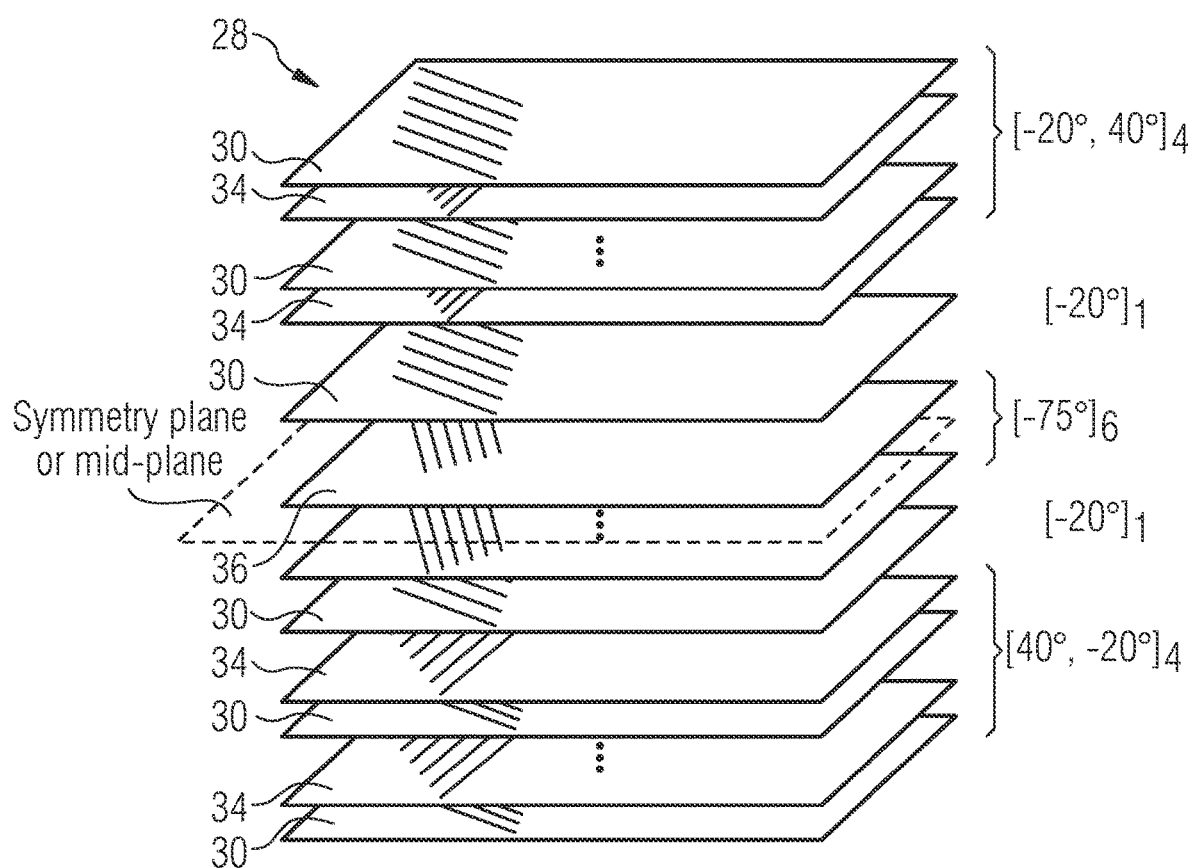
FIG. 8 shows a second embodiment of the ply arrangement of the composite structural element.

FIG. 8 shows a second embodiment of the ply arrangement of the composite structural element following a more general formula. As is shown in FIG. 8, the composite structural element 12, 14 preferably has the following structure:

[[−20°, 40°]4, [−20°], [−75°]6, [−20°], [40°, −20°]4]
Further example lay-ups 28 are:
[[−20°, 40°]2, [−75°]2, [40°, −20°]2] or
[[−20°, 40°]4, [−20°], [−75°]6, [−20°], [40°, −20°]4] or
[[−20°, 40°]4, [−75°]2, [90°]2, [−75°]2,[40°, −20°]4] or
[[−20°, 40°]4, [−75°], [−90°], [−75°]2, [−90°], [−75°], [40°, −20°]4].

As experimental constraints, the material chosen was a tape of 0.125 mm and of the type T300/5208, and a symmetric lay-up was used. Plate thickness was t=3 mm in this case, plate dimensions were 200×600 mm, and 50 N/mm shear flow loading (both positive and negative directions) was applied.

As shown above, the evaluated configurations are:
First row: conventional prior art applying the arrangement of [−45°, +45°]4S, as described above.
Second row: prior art arrangement of patent document 1, being [−20°/40°]4S, as described above.
Third row: a preferred arrangement of the present disclosure, being in this case [[−20°, 40°]3, −20°, [−75°]3]S, meaning a symmetric arrangement—from top to bottom—of 3 [−20°, 40°] ply pairs, followed by 1 [−20°] ply, followed by 6 [−75°] plies, followed by 1 further [−20°] ply and followed in turn by 4 [40°, −20°] ply pairs.

The first entry in each cell shows the maximum deflection in mm, while the second entry shows the maximum compression strain (a dimensionless quantity).

The corresponding Eigen-values for the angle-ply solution (depending on the sign of loading) were 4.92/−5.84. As further shown in the table, the load level corresponds to PBR=1.3 (for the "weak" direction of the conventional arrangement in the first row) times the level 4.92, i.e., 6.396.

Also here, the lay-up 28 solution (third row) outperforms the [−45°, +45°]4S approach of the conventional prior art in terms of maximum deflection and maximum compression strain, and provides a considerable improvement in relation to the approach of patent document 1 (second row). It is thus documented that the insertion of a number of [−75°] plies provides a surprising beneficial effect with respect to post-buckling resilience.

For the solution of FIG. 8, to become more realistic in terms of implementation, some extra plies preferably are added between [−75°] plies in order to increase manufacturing stability.

Figure 9:
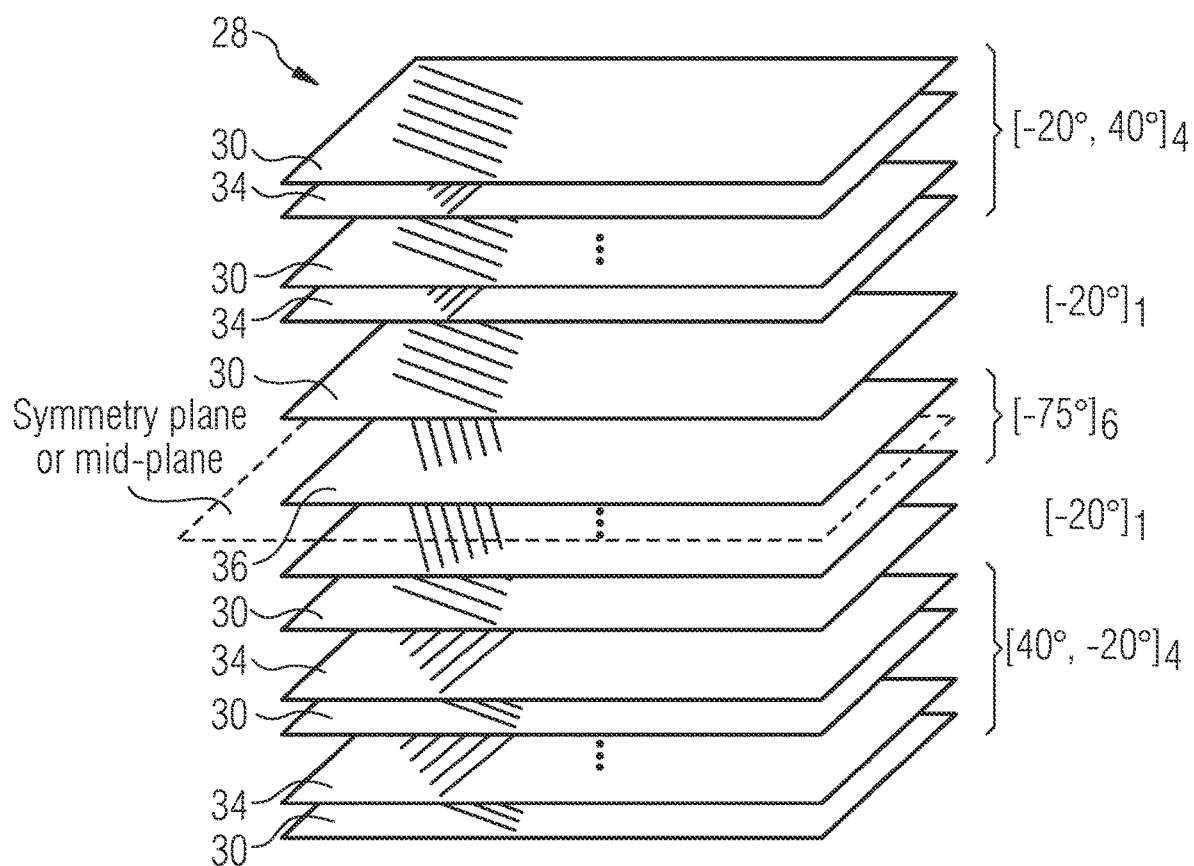
FIG. 9 shows a third embodiment of the ply arrangement of the composite structural element.

FIG. 9 shows a third embodiment of the ply arrangement of the composite structural element. In coincidence with FIG. 8, the composite structural element 12, 14 preferably has the following structure: [[α, β]4; [α]1; [γ]6; [α]1; [β, α]4].

As experimental constraints, the material chosen was a tape of 0.125 mm and of the type T300/5208, and a symmetric lay-up was used. Plate thickness was t=3 mm in this case, plate dimensions were 200×400 mm in this case, and 50 N/mm shear flow loading (both positive and negative directions) was applied.

As shown above, the evaluated configurations are:

First row: conventional prior art applying the arrangement of [−45°, +45°]4S, as described above.

Second row: prior art arrangement of patent document 1, being [−20°/40°]4S, as described above.

Third row: a preferred arrangement of the present disclosure, being in this case [[−20°, 40°]3, −20°, [−75°]3]S, meaning a symmetric arrangement—from top to bottom—of 3 [−20°, 40°] ply pairs, followed by 1 [−20°] ply, followed by 6 [−75°] plies, followed by 1 further [−20°] ply and followed in turn by 4 [40°, −20°] ply pairs.

The first entry in each cell shows the maximum deflection in mm, while the second entry shows the maximum compression strain (a dimensionless quantity).

The corresponding Eigen-values for the angle-ply solution (depending on the sign of loading) were 5.5/−6.5. As further shown in the table, the load level corresponds to PBR=1.3 (for the "weak" direction of the conventional arrangement in the first row) times the level 5.5, i.e., 7.16.

Also here, the lay-up 28 solution (third row) outperforms the [−45°, +45°]4S approach of the conventional prior art in terms of maximum deflection and maximum compression strain, and provides a considerable improvement in relation to the approach of patent document 1 (second row). It is thus documented that the insertion of a number of [−75°] plies provides a surprising beneficial effect with respect to post-buckling resilience.

For the solution of FIG. 9, the results are the similar to those of FIG. 8. Further, in coincidence with FIG. 8, for the solution to become more realistic in terms of implementation, some extra plies preferably are added between [−75°] plies in order to increase manufacturing stability.

Figure 10:
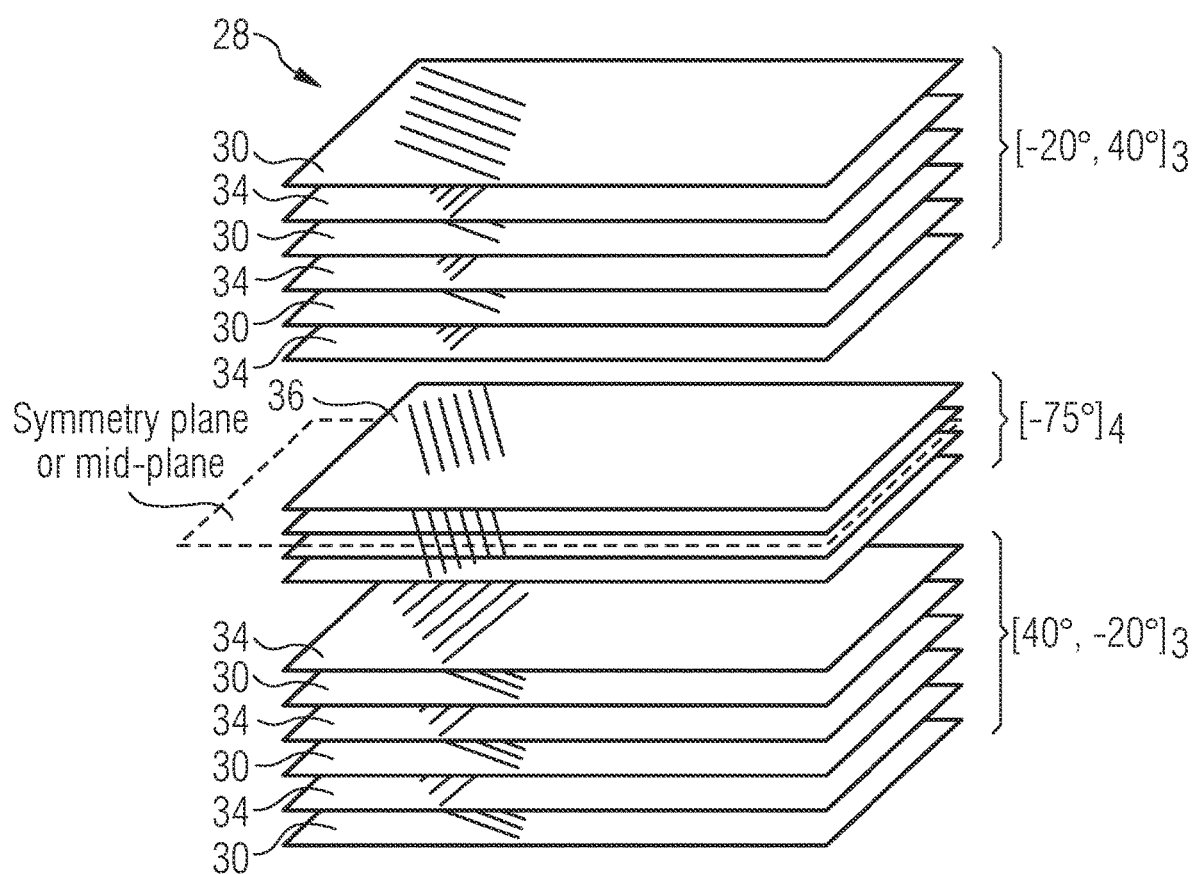
FIG. 10 shows a fourth embodiment of the ply arrangement of the composite structural element.

FIG. 10 shows a fourth embodiment of the ply arrangement of the composite structural element. The composite structural element preferably has the following structure: [[α, β]3; [γ]4; [β, α]3].

As experimental constraints, the material chosen was a tape of 0.125 mm and of the type T300/5208, and a symmetric lay-up was used. Plate thickness was t=2 mm, plate dimensions were 200×400 mm in this case, and 50 N/mm shear flow loading (both positive and negative directions) was applied.

As shown above, the evaluated configurations are:

First row: conventional prior art applying the arrangement of [−45°, +45°]4S, as described above.

Second row: prior art arrangement of patent document 1, being [−20°/40°]4S, as described above.

Third row: a preferred arrangement of the present disclosure, being in this case [[−20°, 40°]3, [−75°]2]S, meaning a symmetric arrangement—from top to bottom—of 3 [−20°, 40°] ply pairs, followed by 4 [−75°] plies and followed in turn by 4 [40°, −20°] ply pairs.

The first entry in each cell shows the maximum deflection in mm, while the second entry shows the maximum compression strain (a dimensionless quantity).

The corresponding Eigen-values for the angle-ply solution (depending on the sign of loading) were 1.56/−2.00. As further shown in the table, the load level corresponds to PBR=1.5 times the level 1.83, i.e. 2.745.

The lay-up 28 solution (third row) outperforms the [−45°, +45°]4S approach of the conventional prior art in terms of maximum deflection and maximum compression strain, and provides a considerable improvement in relation to the approach of patent document 1 (second row). It is thus documented that the insertion of a number of [−75°] plies provides a surprising beneficial effect with respect to post-buckling resilience.

The results of FIG. 10 are similar to those in FIG. 7, in which the tape had dimensions of 200×600 mm.

Figure 11:
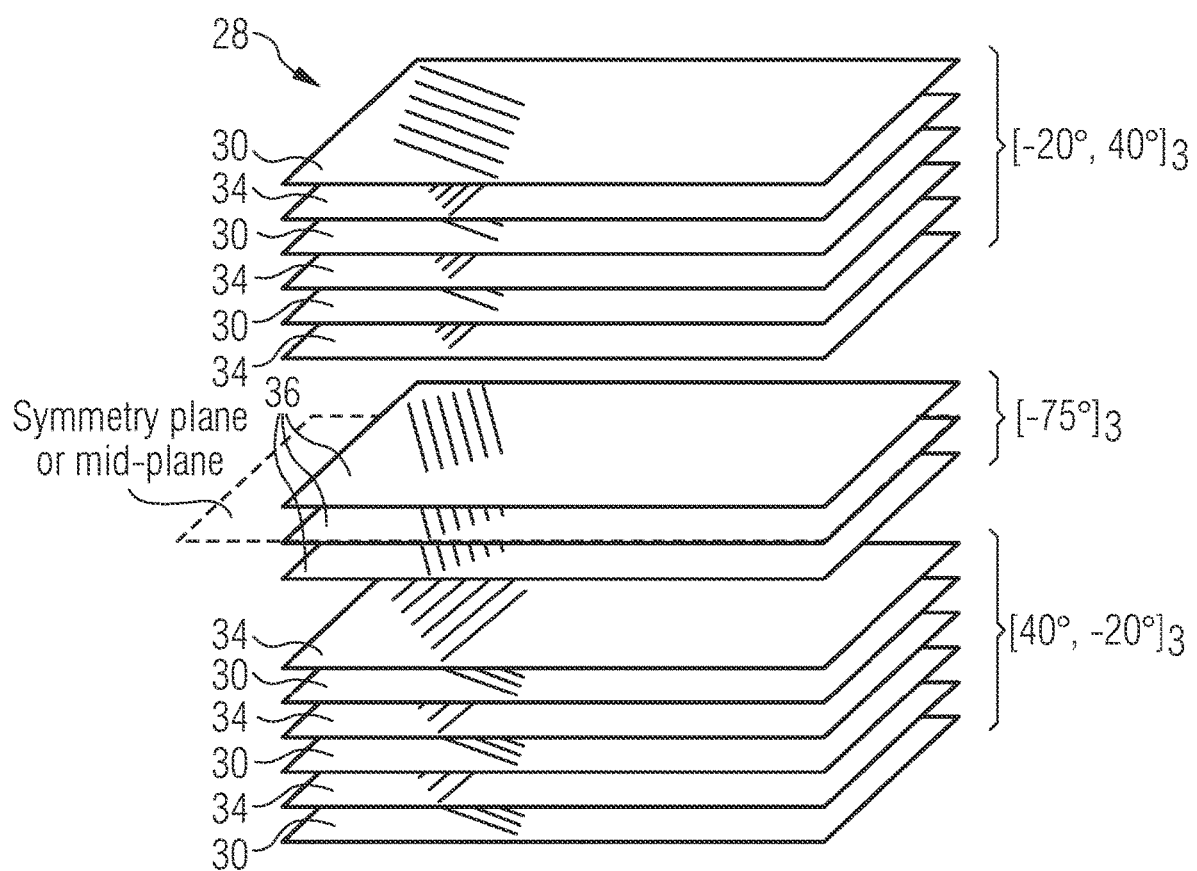
FIG. 11 shows a fifth embodiment of the ply arrangement of the composite structural element.

FIG. 11 shows a fifth embodiment of the ply arrangement of the composite structural element. In particular, FIG. 11 shows the weight saving capability, as 16 plies of the state of the art +/−45° can be replaced by 15 plies according to the present disclosure. The composite structural element 12, 14 preferably has the following structure: [[α, β]3; [γ]3; [β, α]3].

As experimental constraints, the material chosen was a tape of 0.125 mm and of the type T300/5208, and a symmetric lay-up was used. Plate thickness was t=2 mm, plate dimensions were 200×400 mm in this case, and 50 N/mm shear flow loading (both positive and negative directions) was applied.

As shown above, the evaluated configurations are:

First row: conventional prior art applying the arrangement of [−45°, +45°]4S, as described above, having 16 plies in total.

Second row: a preferred arrangement of the present disclosure, being in this case [−20°, 40°]3, [−75°]3, [40°, −20°]3, meaning a symmetric arrangement—from top to bottom—of 3 [−20°, 40°] ply pairs, followed by 3 [−75°] plies and followed in turn by 4 [40°, −20°] ply pairs, having 15 plies in total.

The first entry in each cell shows the maximum deflection in mm, while the second entry shows the maximum compression strain (a dimensionless quantity).

The corresponding Eigen-values for the angle-ply solution (depending on the sign of loading) were 1.56/−2.00. As further shown in the table, the load level corresponds to PBR=1.5 times the level 1.56, i.e. 2.184.

The lay-up 28 solution (second row) is comparable to the [−45°, +45°]4S approach of the conventional prior art in terms of maximum deflection and maximum compression strain, but provides an improvement in terms of weight saving: the results of the table show that the approach of the present disclosure has a 6.3% weight reduction as compared to the conventional prior art. It is thus documented that the insertion of a number of [−75°] plies provides a surprising beneficial effect not only with respect to post-buckling resilience, but also with respect to weight savings.

It is believed that the advantages of the technique presented herein will be fully understood from the foregoing description, and it will be apparent that various changes may be made in the form, constructions and arrangement of the exemplary aspects thereof without departing from the scope of the present disclosure or without sacrificing all of its advantageous effects. Because the technique presented herein can be varied in many ways, it will be recognized that the present disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A composite structural element comprising:
   a substantially planar main section defining a coordinate system with a first axis extending along a longitudinal axis of the structural element and a second axis extending perpendicular to said longitudinal axis within the planar main section and defining an angle of +90° with the first axis,
   wherein the structural element contains a lay-up of single plies each comprising a fiber-reinforced composite material with a substantially unidirectional fiber orientation,
   wherein the lay-up comprises N plies arranged from top to bottom in the following form, N being an positive integer number equal to or greater than 5:
   $[[\alpha, \beta]M; [\gamma]K; [\beta, \alpha]M]$, wherein:
   α, β and γ represent one ply having an angle enclosed between the first axis and the unidirectional fiber orientation of the one ply, respectively,
   [x]y means y plies each having angle x;
   [x, y]z means z pairs of plies, each pair of plies having angles x, y, respectively;
   α=−20°, β=40°, γ=−75° or α=20°, β=−40°, γ=75°, wherein each angle has a tolerance of −5° to +5°; and
   K is a positive integer number equal to or greater than 1 and M is a positive integer number equal to or greater than 1 as follows:
   $N=4 \cdot M+K$.

2. The composite structural element according to claim 1 having the following structure:
   $[[\alpha, \beta]_M; [\alpha]; [\gamma]_K; [\alpha]; [\beta, \alpha]_M]$, wherein:
   $N=2+4 \cdot M+K$.

3. The composite structural element according to claim 1, further comprising:
   at least one further ply having an angle δ enclosed between the first axis and the unidirectional fiber orientation of the at least one further ply, wherein:
   δ is −20°, 90° or another value;
   the at least one further ply is interposed between one or more of the N plies; and
   the lay-up comprises N+P plies, P being a positive natural number equal to or greater than 1 and designating a number of further plies.

4. The composite structural element according to claim 3, where the lay-up comprises N plies arranged from top to bottom in the following form:
   $[[\alpha, \beta]M, [\delta]L, [\gamma]K, [\delta]P, [\gamma]K, [\delta]L, [\beta, \alpha]M]$, wherein:
   L is 0 or 1;
   P is between 0 and 2; and
   $N=4*M+2*L+2*K+P$.

5. The composite structural element according to claim 1, wherein K is equal to or lower than N/3.

6. The composite structural element according to claim 5, wherein K is equal to or lower than N/4.

7. A torsion box for use in an aircraft structural component, comprising:
   at least one rib being a composite structural element according to claim 1; and
   at least one spar being a composite structural element according to claim 1.

8. An aircraft comprising a torsion box according to claim 7.

* * * * *